United States Patent [19]

DeMunda

[11] 4,178,413

[45] Dec. 11, 1979

[54] FIBER REINFORCED CARBON AND GRAPHITE ARTICLES AND A METHOD OF PRODUCING SAID ARTICLES

[75] Inventor: Gabriel P. DeMunda, Niagara Falls, N.Y.

[73] Assignee: The Carborundum Company, Niagara Falls, N.Y.

[21] Appl. No.: 838,702

[22] Filed: Oct. 3, 1977

[51] Int. Cl.$^2$ .............................................. B32B 9/00
[52] U.S. Cl. ................... 428/408; 264/29.5; 427/227; 427/228; 427/249
[58] Field of Search ............. 428/245, 280, 260, 284, 428/288, 408; 427/227, 228, 248 H, 249; 264/29

[56] References Cited

U.S. PATENT DOCUMENTS

| | | | |
|---|---|---|---|
| 3,027,278 | 3/1962 | Reick | 427/248 H |
| 3,542,582 | 11/1970 | Degginger | 428/408 |
| 3,980,105 | 9/1976 | Myskouski | 428/408 |
| 3,991,248 | 11/1976 | Bauer | 428/408 |
| 4,064,207 | 12/1977 | De Crescente et al. | 428/408 |

FOREIGN PATENT DOCUMENTS 2042647  3/1971  Fed. Rep. of Germany ........... 428/408

*Primary Examiner*—James J. Bell
*Attorney, Agent, or Firm*—David E. Dougherty; Raymond W. Green; Donald C. Studley

[57] ABSTRACT

The present invention relates to fiber reinforced carbon and graphite articles that are characterized by a matrix of fibrous carbon material bonded together by a deposited pyrolytic material and having the residue of a carbonized filler material dispersed within the article in contact with the pyrolytic material.

Fiber reinforced carbon and graphite articles are produced by
  (1) Forming reinforcing fibers into a shape without any binder material,
  (2) Infiltrating the fibers with a pyrolytic material in a manner to deposit pyrolytic material on the fibers and bond together the fibers, to form a bonded body,
  (3) Subsequently impregnating the bonded body with a carbonizable filler material, and,
  (4) Curing and carbonizing the filler material.

The articles are substantially free of internal cracks and voids and are of high strength even at relatively low densities. As such, the articles are particularly useful in the aerospace industry where strong, lightweight materials are required. The articles of the present invention are found to have substantially improved freedom of internal stresses which prior art carbon or graphite articles have been particularly susceptible.

17 Claims, No Drawings

FIBER REINFORCED CARBON AND GRAPHITE ARTICLES AND A METHOD OF PRODUCING SAID ARTICLES

BACKGROUND OF THE INVENTION

This invention relates to reinforced carbon bodies. More particularly, it relates to reinforced carbon bodies composed of a matrix of fibrous carbon material bonded together and substantially coated by a deposited pyrolytic material and having the residue of a carbonized filler material deposited on said pyrolytic material, preferably to interconnect said pyrolytic material. The articles comprise an underlying matrix or network of fibrous carbon material which forms the skelton of the carbon body and may be produced by infiltrating the matrix with a pyrolytic material in a manner to depose the pyrolytic material on the fibrous carbon material and bond together the fibrous carbon material to form a bonded body, subsequently impregnating said bonded body with a carbonizable filler, curing and carbonizing the filler, and, if desired, repeating the impregnating, curing and carbonizing steps. The final product may be graphitized. Such bodies usually contain from about 10 percent to about 65 percent by volume of reinforcing carbon fibers, preferably about 45 percent, and from about 35 percent to about 90 percent by volume of carbonaceous material, preferably about 55 percent. As used hereafter, the term "carbon" includes both ungraphitized and graphitized carbon. Thus, a reinforced carbon body can comprise either graphitized, partially graphitized or ungraphitized reinforcing carbon fibers or a mixture thereof and either graphitized, partially graphitized or ungraphitized carbon filler.

Reinforced carbon bodies of the present invention can also include material other than carbon to modify the properties in various ways. For example, U.S. Pat. No. 3,672,936 describes the use of boron and boron compounds to improve several of the properties.

The specific reinforced carbon bodies with which the present invention is particularly concerned are those which are subjected to circumferencial stress. A prime example of such carbon body is a friction disc for use in disc brakes. Such discs are essentially annular in shape, having outer and inner perimeters, at least one perimeter of each disc being provided with a friction-bearing surface. When contact occurs with the friction-bearing surface, the mechanical energy of the rotating portion of the brake is converted to heat. Because of carbon strength, density, heat capacity, thermal conductivity, co-efficient of friction and stability to its sublimation temperature (about 3600° C.), carbon has been proposed for use in disc brakes, particularly where weight is a major consideration (such as in aircraft).

One method of producing articles of this type is to coat sheets of graphite cloth with a suitable binder, stack the sheets and heat the stacked sheets to carbonize the binder. When applying the coating of binder to the graphite cloth sheet, it is extremely difficult, if not impossible, to avoid variations in the thickness of the binder layer on the sheet. Consequently, as the sheets are stacked, there will be a variation of the binder thickness between the graphite cloth sheets. As the stacks of graphite cloth sheets are heated in order to first cure and then carbonize the binder, the binder will expand within the stacks at an uneven rate due to the variation of the binder thickness. At the carbonizing temperature the binder, as it is converted into carbon, contracts, and this contraction will also occur at a non-uniform rate due to the variation in thickness of the original binder layer. The resulting body has set up within it internal stresses due to the uneven rate of expansion and contraction of the binder which eventually will lead to cracks within the body when subjected to conditions of stress. Accordingly, when forming laminated carbon or graphite articles by this process, it is sometimes necessary to restrict the thickness of the article in order to hold the uneven expansion and contraction of the binder caused by variations in binder thickness to a minimum.

Another method of producing articles of this type is to pyrolytically deposit carbon by known vapor deposition techniques on fibrous carbon material to produce a reinforced carbon product. However, this method generally produces a product that is inconsistent in physical properties from batch to batch. It is postulated that the individual carbon crystallites arrange themselves in a planar manner when being deposited on the fibrous carbon material, and, as it is attempted to densify the articles, the crystallites, while filling the voids between fibers, also seal off both the deeper voids and the surface, leaving the inner portion impermeable to further deposition within the article. Thus, such deposition alone produces an article having good surface characteristics but, when shaped or machined, is frequently found not to have the desired strength and wear characteristics.

As used herein, the following terms shall have the following meaning:

(a) Fibrous Carbon Material is produced by the heat treating of both natural and synthetic fibers of materials such as wool, rayon, polyacrolynitrile and pitch at high temperatures.

(b) Pyrolytic Material refers to the material which is deposited on a substrate by the thermal pyrolysis of a gas.

(c) Pyrolytic Carbon refers to the carbon which is deposited on a substrate by the thermal pyrolysis of a carbon containing gas.

(d) Carbonizable Filler Material refers to char-producing materials such as petroleum pitch or polymeric plastics or resins that have ablative characteristics. For example, included in the latter group are: the phenolics and modified phenolics, furanes, polyimides, melamines, ureas, and epoxies. The polymer of liquid furfuryl alcohol has been found to have penetrating and flow characteristics which are particularly suited to use in the present invention.

(e) Density refers to bulk or apparent density.

SUMMARY OF INVENTION

The present invention relates to high-strength, fiber-reinforced carbon or graphite composite articles which are produced by forming a substrate from fibrous graphite or carbon material. The substrate is then infiltrated with a pyrolytic material in a manner as to bond together the fibrous materials of the substrate. Such process is carried out by known techniques of chemical vapor deposition. Each filament of the substrate is substantially enveloped with a coating or film of deposed pyrolytic material. The pyrolytic material is preferably pyrolytic carbon. The depositing of layers of pyrolytic material on and around the individual carbon fibers produces a bonded article. After bonding, it has now been found that the article may be impregnated with a carbonizable filler material and the filler material cured under pressure and heat. The impregnated article is then heated to carbonize the filler material. The impregnating, curing and carbonizing cycle may be repeated to produce a denser product. It has been found that repeating the cycle from five to ten times produces a dense, strong article having wear characteristics aptly suited to use to produce friction disc brake members for heavy aircraft.

Carbon made from rayon is aptly suited to use as the fibrous carbon starting material. The fibrous carbon starting material may be formed into a shape by stacking layers of woven fibers on an assembly, or by wrapping the fibers in the form of filaments, yarn, tapes or woven, or felted fabrics around a mandrel.

After the shaped substrate has been formed, the fibers of the substrate are provided with a coating of pyrolytic material bonding the contiguous fibers, by known chemcial vapor deposition techniques. It is important that, during the coating and bonding step, each individual fiber of the substrate be provided with a coating that is as uniform as possible. In this way the contiguous fibers of the substrate material are effectually bonded together in a manner as to securely hold the substrate in a shaped configuration.

Any suitable impregnant which will carbonize when heated at elevated temperatures may be used as the carbonizable filler material. As recited in the foregoing, phenolic condensation products, urea condensation products, epoxy resins, and petroleum pitch are suited to use. However, it is preferred to use a polymer of liquid furfuryl alcohol as the impregnant.

DETAILED DESCRIPTION

The reinforced carbon or graphite articles of the present invention are made by forming a matrix from layers of fibrous carbon material, preferably in the form of layers of cloth, felt or wool. In the forming of the matrix, the fibrous carbon material is used in "dry" condition; that is, without the application of a binder or other type of coating. Means, such as an assembly, are used to clamp or hold the dry fibrous carbon material in the desired shape. Preferably, in the case of cloth, the shape is circular and is perforated with a centralized hole which facilitates entrance of the pyrolytic material, preferably carbon, through the center of the assembly and thus outward through and between each layer of fibers in the assembly. In the case of loose filaments, such filaments may be packed around a perforated feed pipe and held in a compressed condition in the assembly. In the case of filaments, the filaments may be wrapped around a perforated mandrel fitted to receive a feed of pyrolytic material through the filament.

The pyrolytic deposition step may be accomplished in any suitable vapor deposition furnace having a temperature range of between about 700°C. to about 1900° C. For example, the fibrous carbon material which makes up the matrix or substrate may be bonded together with a vapor deposited coating of carbon. This can be accomplished by deposited pyrolytic carbon from a carbonaceous gas such as methane, ethane, butane, or propane which disassociates under the influence of heat. The carbonaceous gas is preferably diluted with an inert gas, for example nitrogen or argon, to facilitate penetration of the article. Generally a ratio of from about 1 part by volume of carbonaceous gas to about 10 parts by volume of inert gas is suitable to use. A ratio of from about 1:1 to about 1:6 has been found eminently useful. The carbonaceous gas may be fed into an evacuated furnace and in such case the diluent gas may be eliminated or the amount of inert gas used can be considerably reduced.

The period of time necessary to effectively bond together the fibrous material of the shaped substrate depends upon various factors such as the volume of the substrate, density of the substrate, skeletal composite structure, fiber size and fiber orientation as well as on the flow rate of the gas, the deposition temperature and the furnace pressure. Although these variances may be empirically resolved, a back pressure of from about 0.5 to about 15 psig, and, more preferably, between about 5 to about 7 psig in the furnace gives a usually reliable indication that bonding has been completed. In general the less the back pressure the greater the number of voids in the bonded body and the greater the amount of impregnant that will be required to produce a dense final product.

After bonding of the fibrous carbon body, the assembly is allowed to cool, and then pressure impregnated with a suitable carbonizable filler material, such as a carbonaceous resin. The article may then be pressure cured, and, after curing, baked using a protective atmosphere of nitrogen at atmospheric pressure. During the baking operation, the temperature of the body is gradually raised from the curing temperature to about 800° C. The rate of temperature increase is largely a function of the size of the article to be baked. Large articles may be baked at a slower rate of temperature increase than smaller articles in order that the temperature be uniform throughout the article, thus avoiding harmful internal stresses that are caused by uneven heating of the article.

After completion of the impregnating, curing and baking steps; the shape may again be placed under vacuum and re-impregnated, cured and baked. The number of impregnation, curing and baking cycles is determined by the density that is desired in the finished article.

After completion of the desired number of impregnation, curing and baking steps, the article may be heat treated at temperatures required for the end use application, for example, the article may be heat treated to a temperature in the neighborhood of 2600° C.

The product of the present invention is a fiber reinforced article which is composed of a matrix of fibrous carbon material. The fibrous carbon material has a coating or film of deposited pyrolytic material on substantially the entire surface of the fibrous carbon material and is bonded together by the pyrolytic material. The residue of a carbonized filler material is deposited on and around the deposed pyrolytic material and preferably interconnects said pyrolytic material and substantially completely fills any voids or interstices between the deposited pyrolytic material. Preferably both the pyrolytic material and the residue from the filler material are carbon.

Although it is within the scope of this invention to produce reinforced carbon or graphite articles of lower density; ie. under 1.40 gm./cc. the preferred density range is between about 1.50 and about 1.85 gm./cc.

The present process is adapted to the utilization of other than carbon, or carbon combined with one or more additional elements to infiltrate or impregnate the reinforcing fibers or bonded product. Boron may suitably be used as such additive.

The following specific examples illustrate more clearly the exact manner in which the processes of the present invention can be carried out, and should not be construed as limited to the particular process details or articles illustrated in the examples.

EXAMPLE 1

A carbon article was produced according to the present process by dry stacking 6 inch circles of carbonized cloth, each circle having a 1½ inch hole in the center and each rotated 90° with respect to the circle underneath it so that the cloth fibers produced a rosette pattern. The circles were arranged in composites of 30 to 50 circles, and each composite was separated by a metal separating plate. In this example, four composites were utilized. The fiber volume was about 45 percent. The composites of dry stacked cloth circles were then lightly clamped to hold the circles in place, and the clamped assembly was placed into a heat treatment furnace with a gas line positioned to feed into the center of the circles. The furnace had the following operating conditions:

Deposition temperature—750° C.
Gas Flow—
Propane 750 cc/min.
Nitrogen 2400 cc/min.
Time—96 hours
Back Pressure when terminated—1.7 psig.

The bonded article, having a density of about 0.85 gm/cc. was placed in an autoclave and purged by evacuation at a vacuum of at least 29 inches of mercury below atmospheric pressure. After purging, the bonded article was impregnated with a liquid furfuryl alcohol polymer, catalyzed with maleic anhydride, at a pressure of about 90 psi for 1½ hours. The resin impregnated shape was maintained under compression and cured at a pressure of from about 90 to about 120 psi at 125° C. for 8 hours. After curing, the shape was baked in a protective atmosphere of nitrogen by raising the temperature to 800° C. Duringthe baking operation care was exercised in raising the temperature of the article so that the temperature was raised at a rate of 5° C. per hour until the article was at 450° C., then the rate of temperature increase was raised to 20° C. per hour until the article was at 800° C. After completion of the baking operation, the article was cooled and the impregnating, curing and baking cycle repeated eight times, using an impregnant consisting of equal parts of liquid furfuryl alcohol polymer and furfuryl catalyzed with 3 percent by weight of maleic anhydride. The density of the final product was found to be 1.57 gm/cc.

EXAMPLE 2

The process of Example 1 was followed utilizing six composites of carbonized rayon cloth at a fiber volume of 40 percent. The cloth had a 9.25 inch outside diameter and 3.5 inch diameter centered gas feedway. The deposition was carried out at 800° C. over a period of 13 days using a gas feed of 1300 cc/min. propane and 7300 cc/min. nitrogen. A back pressure of slightly less than 1 psig had developed when deposition was terminated. The bonded article was found to have a density of 1.41 gm/cc. The article was then treated with eight impregnation, curing and charing cycles. After the eighth cycle, the temperature of the article was raised to about 2650° C. The higher temperature reduced any volatiles remaining from the impregnating steps and substantially graphitized the entire article. The final density was found to be 1.67 gm/cc.

EXAMPLE 3

The process of Example 1 was followed utilizing one composite consisting of 170 pieces of carbonized polyacrylonitrile cloth at a fiber volume of 20 percent. The cloth had a 6 inch outer diameter with a 1½ diameter feedway. The deposition was carried out at 775° C. over a period of 11 days utilizing a gas feed of 600 cc/min. propane and 2400 cc/min. nitrogen. A back pressure of slightly less than 1 psig had developed when the deposition was terminated. The bonded article was found to have a density of 0.91 gm/cc. The article was then treated with ten impregnation, curing and charing cycles. The density of the final product was found to be 1.83 gm/cc.

EXAMPLE 4

The process of Example 1 was again repeated utilizing four composites of carbonized rayon cloth at a fiber volume of 45 percent. The cloth had a 6 inch outer diameter with a 1½ inch diameter hole. The deposition was carried out at 800° C. over a period of 12 days using a gas feed of 700 cc/min. propane diluted with 2400 cc/min. of nitrogen. A back pressure of 11 psig had built up when deposition was terminated. The bonded article was found to have a density of 1.51 gm/cc. The article was then treated with six impregnation, curing and charing cycles. The density of the final product was found to be 1.65 gm/cc.

EXAMPLE 5

The process of Example 1 was again repeated using a stack of 18 composites of carbonized rayon cloth having an outside diameter of 16.5 inches with a 9.5 diameter centered hole. The cloth when clamped in the assembly had a fiber volume of 44 percent. Deposition was carried out at 800° C. over a period of 11 days using a gas feed of 8.5 liter/min. of propane diluted with 120 SCFH of nitrogen. A back pressure of 1.2 psig had developed when deposition was terminated. The bonded article was found to have a density of 1.37 gm/cc. The article was then exposed to eight impregnation, curing and carbonization cycles. The density of the final product was found to be 1.66 gm/cc.

What is claimed is:

1. A fiber reinforced article composed of a matrix of fibrous carbon material bonded together by a deposited pyrolytic material and having the residue of a carbonizable filler material deposited on said pyrolytic material, said residue produced by initially depositing and subsequently carbonizing said carbonizable filler material on said pyrolytic material.

2. The article of claim 1 wherein the said fibrous carbon material is substantially entirely coated by said pyrolytic material.

3. The article of claim 1 wherein the pyrolytic material is carbon.

4. The article of claim 1 wherein the pyrolytic material has been vapor deposited.

5. The article of claim 4 wherein the pyrolytic material is carbon.

6. The article of claim 1 wherein the article is substantially entirely carbon.

7. The article of claim 1 wherein the article is substantially entirely graphite.

8. The article of claim 1 wherein the carbonized filler material substantially entirely interconnects said deposited pyrolytic material.

9. The article of claim 1 wherein the fibrous carbon material is carbonized rayon.

10. A method of producing fiber reinforced carbon articles by:
   (a) forming a fibrous carbon material into a shape without the use of a binder material,
   (b) infiltrating said fibers with a pyrolytic material in a manner to deposit said pyrolytic material on said fibers and bond together said fibers to form a bonded body,
   (c) subsequently impregnating said bonded body with a carbonizable filler material, and,
   (d) curing and subsequently carbonizing said filler material within said bonded body.

11. The method of claim 10 wherein the pyrolytic material is a product of the vapor deposition of a gas selected from the group of methane, ethane, butane and propane.

12. The method of claim 10 wherein steps (c) and (d) are repeated to produce a substantially solid product.

13. The method of claim 10 wherein the pyrolytic material is carbon.

14. The method of claim 10 wherein the fibers are in the form of cloth.

15. The method of claim 14 wherein the cloth is carbonized rayon.

16. The method of claim 10 wherein the product of step (d) is heat treated in a range of between about 2600° C. and 2700° C. to substantially graphitize the article.

17. The method of claim 10 wherein the fibrous carbon material is carbonized polyacrylonitrile.

* * * * *